United States Patent
Wu et al.

(10) Patent No.: US 8,007,876 B2
(45) Date of Patent: Aug. 30, 2011

(54) LIQUID CRYSTAL DISPLAY AND FABRICATION METHOD THEREOF

(75) Inventors: Chun-Ming Wu, Banqiao (TW);
Shih-Hsien Liu, Jhubei (TW);
Chih-Lung Chin, Longtan Township (TW); Kung-Lung Cheng, Hsinchu (TW); An-Cheng Chen, Hsinchu (TW)

(73) Assignee: Industrial Technology Research Institute (TW)

( * ) Notice: Subject to any disclaimer, the term of this patent is extended or adjusted under 35 U.S.C. 154(b) by 134 days.

(21) Appl. No.: 12/489,771

(22) Filed: Jun. 23, 2009

(65) Prior Publication Data

US 2010/0128215 A1    May 27, 2010

(30) Foreign Application Priority Data

Nov. 25, 2008  (TW) .............................. 97145453 A

(51) Int. Cl.
*C09K 19/54* (2006.01)
*G02F 1/1333* (2006.01)

(52) U.S. Cl. ......................................... 428/1.1; 349/185

(58) Field of Classification Search ............. 252/299.01, 252/299.5, 299.7; 428/1.3; 349/185
See application file for complete search history.

(56) References Cited

U.S. PATENT DOCUMENTS

| | | | |
|---|---|---|---|
| 6,217,792 B1 | 4/2001 | Parri et al. | |
| 6,281,952 B1 * | 8/2001 | Okamoto et al. | 349/12 |
| 6,359,673 B1 | 3/2002 | Stephenson | |
| 6,504,588 B1 * | 1/2003 | Kaneko | 349/71 |
| 2003/0043334 A1 * | 3/2003 | Sato et al. | 349/156 |
| 2008/0280071 A1 * | 11/2008 | Kikuchi et al. | 428/1.1 |

FOREIGN PATENT DOCUMENTS

| | | | |
|---|---|---|---|
| EP | 1058147 A2 | | 6/2000 |
| GB | 2355315 A | * | 4/2001 |
| JP | 07-287214 | | 10/1995 |

OTHER PUBLICATIONS

Vill et al.; "Helical Twisting Power of Carbohydrate Derivatives"; F. Fischer and J. Thiem Nature Research, 43a; Sep. 30, 1988; pp. 1119-1125.

* cited by examiner

*Primary Examiner* — Shean Wu

(74) *Attorney, Agent, or Firm* — Lowe Hauptman Ham & Berner, LLP

(57) ABSTRACT

A liquid crystal display (LCD) and a fabrication method thereof are provided. The LCD includes a first substrate and a second substrate opposite to the first substrate. At least two layers of cholesteric liquid crystal layers are disposed between the first and the second substrates, wherein chiral dopants with different optical activities are respectively added in the cholesteric liquid crystal layers, and the chiral dopants have the same chemical structure. The fabrication method includes providing a first substrate and a second substrate opposite to the first substrate. A plurality of chiral dopants with different optical activities and having the same chemical structure are mixed into the same liquid crystal host respectively to form at least two kinds of cholesteric liquid crystal materials. Then, the cholesteric liquid crystal materials are disposed between the first and the second substrates to form at least two layers of cholesteric liquid crystal layers.

20 Claims, 3 Drawing Sheets

LIQUID CRYSTAL DISPLAY AND FABRICATION METHOD THEREOF

CROSS REFERENCE TO RELATED APPLICATIONS

This Application claims priority of Taiwan Patent Application No. 97145453, filed on Nov. 25, 2008, the entirety of which is incorporated by reference herein.

BACKGROUND OF THE INVENTION

1. Field of the Invention

The invention relates to a liquid crystal display, and more particularly to a liquid crystal display having left-handed and right-handed cholesteric liquid crystals and a fabrication method thereof.

2. Description of the Related Art

Reflective cholesteric liquid crystal displays have several advantages of high brightness, high contrast, low power consumption, wide viewing angles, and high reflectiveness. The cholesteric liquid crystals used in the reflective cholesteric liquid crystal displays can reflect lights of certain wavelengths. Specifically, a circular polarized light having the same chirality as the cholesteric liquid crystal can be reflected, and another circular polarized light having an opposite chirality will pass through the cholesteric liquid crystal.

In general, the cholesteric liquid crystals are formed by adding a chiral dopant into a nematic liquid crystal host. The chiral dopant can reflect a left-handed light or a right-handed light. When lights permeate through the cholesteric liquid crystals which can reflect a left-handed light, about 50% of the lights would be reflected and another 50% of the lights would pass through the cholesteric liquid crystals. Accordingly, if 100% of light reflection is desired, left-handed and right-handed cholesteric liquid crystals are required to be stacked to enhance reflection.

Europe Patent No. EP1058147 discloses a liquid crystal display, in which a stack of left-handed and right-handed cholesteric liquid crystals is used to increase reflection. The left-handed and the right-handed cholesteric liquid crystals used in this liquid crystal display are polymer-dispersed liquid crystals (PDLC), which are capsulate cholesteric liquid crystals. The cholesteric liquid crystals are packaged into balls for coating in a liquid crystal cell of the liquid crystal display. In addition, U.S. Pat. No. 6,359,673 also discloses a liquid crystal display formed by stacking left-handed and right-handed cholesteric liquid crystals, in which, the left-handed and the right-handed cholesteric liquid crystals are dispersed in the liquid crystal cell in the form of capsules.

However, the required driving voltages of the above cholesteric liquid crystals are relatively high. Additionally, the chemical structures of the chiral dopants in the left-handed and the right-handed cholesteric liquid crystals are not disclosed in the above prior arts. Also, the effects of the chiral dopants on the driving voltages of the left-handed and the right-handed cholesteric liquid crystals are also not disclosed in of the above prior arts.

BRIEF SUMMARY OF THE INVENTION

The invention provides a liquid crystal display. The liquid crystal display comprises a first substrate and a second substrate opposite to the first substrate. At least two layers of cholesteric liquid crystal layers are disposed between the first and the second substrates, wherein a plurality of chiral dopants with different optical activities are respectively added in the cholesteric liquid crystal layers, and the chiral dopants have the same chemical structure.

The invention further provides a method for fabricating a liquid crystal display. The fabrication method comprises providing a first substrate. A second substrate is provided to dispose opposite to the first substrate. A liquid crystal host is provided and a plurality of chiral dopants with different optical activities are respectively added into the liquid crystal host to form at least two kinds of cholesteric liquid crystal materials, wherein the chiral dopants have the same chemical structure. Then, the cholesteric liquid crystal materials are disposed between the first and the second substrates to form at least two layers of cholesteric liquid crystal layers.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

The invention utilizes chiral dopants having different optical activities and the same chemical structure for mixing with the same liquid crystal host to form left-handed and right-handed cholesteric liquid crystals. The left-handed and the right-handed cholesteric liquid crystals are stacked by different layers to form a liquid crystal layer of a liquid crystal display.

Figure 1:
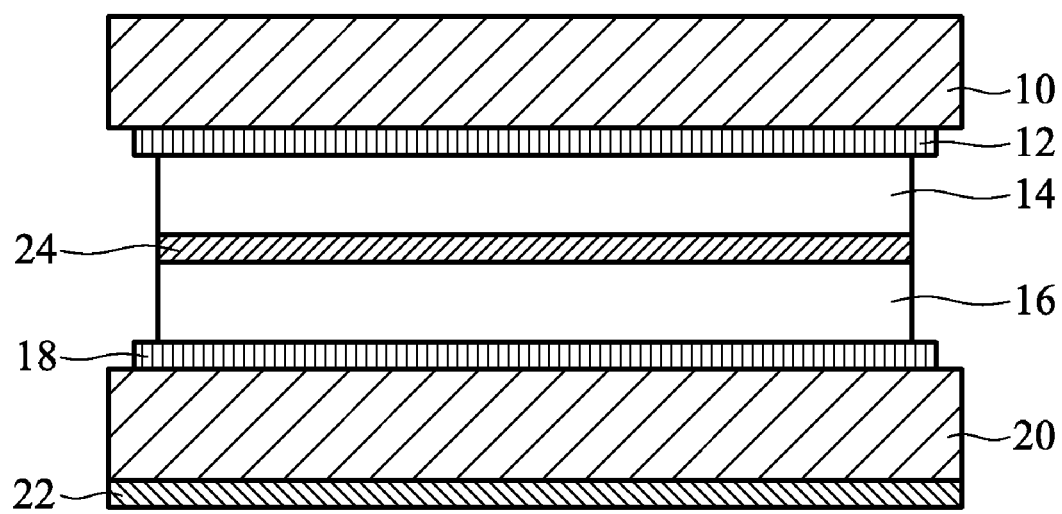
FIG. 1 is a schematic cross section of a liquid crystal display according to one embodiment of the invention.

Referring to FIG. 1, a cross section of a liquid crystal display according to one embodiment of the invention is shown. In this embodiment, the liquid crystal display includes a first substrate 10 and a second substrate 20 disposed opposite to the first substrate. The first substrate 10 and the second substrate 20 may be a glass substrate or a plastic substrate. A first electrode layer 12 is disposed on the first substrate 10. The first electrode layer 12 may be formed from transparent conductive materials such as indium tin oxide (ITO). At least two layers of cholesteric liquid crystal layers 14 and 16 are disposed between the first substrate 10 and the second substrate 20, wherein the cholesteric liquid crystal layer 14 may be a left-handed cholesteric liquid crystal layer and the cholesteric liquid crystal layer 16 is a right-handed cholesteric liquid crystal layer. In another embodiment, the cholesteric liquid crystal layer 14 may be a right-handed cholesteric liquid crystal layer and the cholesteric liquid crystal layer 16 is a left-handed cholesteric liquid crystal layer. Not that there may be more than two layers of cholesteric liquid crystal layers disposed between the first substrate 10 and the second substrate 20. In one embodiment, the cholesteric liquid crystal layers 16 and 14 can be formed on the second substrate 20 in sequence by coating, and then the first substrate 10 is provided to cover the cholesteric liquid crystal layer 14. In addition, in another embodiment, a liquid crystal cell is formed between first substrate 10 and the second substrate 20, and then the cholesteric liquid crystal layers 16 and 14 are injected into the liquid crystal cell, respectively.

The above left-handed cholesteric liquid crystal layer is formed by adding a left-handed chiral dopant into a liquid crystal host. The above right-handed cholesteric liquid crystal layer is formed by adding a right-handed chiral dopant into the same liquid crystal host as the left-handed cholesteric liquid crystal layer. The liquid crystal host may be a nematic liquid crystal, a smectic liquid crystal or a discotic liquid crystal. The character of the invention is that the left-handed chiral dopant and the right-handed chiral dopant in the cholesteric liquid crystal layer have the same chemical structure, which is represented by Formula (I):

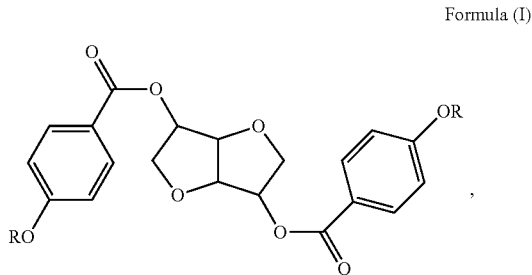

Formula (I)

wherein R is $C_{1-6}$ alkyl, such as $CH_3 \sim C_6H_{13}$.

In one embodiment of the invention, the liquid crystal host in the cholesteric liquid crystal layer may be about 90 to 96 weight %, and the left-handed or the right-handed chiral dopant may be about 4 to 10 weight %. The liquid crystals of different reflective wavelengths can be formed by adjusting the adding ratio of the chiral dopants.

In one embodiment of the invention, a molecular stereo-structure of the right-handed chiral dopant is represented by Formula (II):

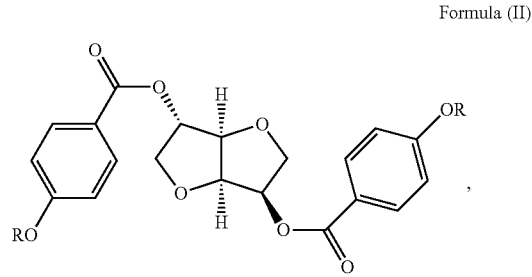

Formula (II)

wherein R is defined as Formula (I).

The left-handed chiral dopant has the same chemical structure as the right-handed chiral dopant and the molecular stereo-structure of the left-handed chiral dopant is represented by Formula (III):

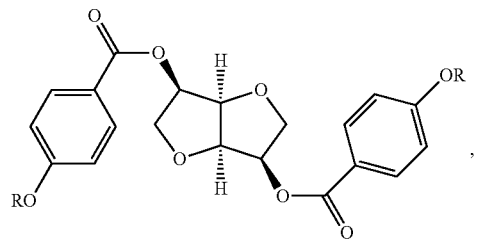

Formula (III)

wherein R is defined as Formula (I).

In a liquid crystal display according to one embodiment of the invention, an isolation film 24 can be disposed between the cholesteric liquid crystal layers 14 and 16. The isolation film 24 may be a glass plate or a flexible plastic plate, wherein chiral between the cholesteric liquid crystal layers 14 and 16 do not disappear. In addition, a second electrode layer 18 is disposed on the surface of the second substrate 20 facing the first substrate 10. The material of the second electrode layer 18 may be a transparent conductive material such as Indium tin oxide (ITO).

The liquid crystal display of the invention may be a reflective cholesteric liquid crystal display and lights permeate through the liquid crystal display through the first substrate 10. Meanwhile, a left-handed light of 50% of the lights is reflected by the left-handed cholesteric liquid crystal layer 14, and a right-handed light of another 50% of the lights is reflected by the right-handed cholesteric liquid crystal layer 16. Accordingly, reflection of the reflective cholesteric liquid crystal display can be enhanced. Further, in a liquid crystal display according to one embodiment of the invention, a light absorptive material layer 22 can be formed on the surface of the second substrate 20 opposite the first substrate 10. The light absorptive material layer 22 is formed from a non-reflective light material, for example, a flat paint or a material containing a black pigment. In addition, in one embodiment of the invention, the second electrode layer 18 may be a light absorptive electrode layer, to eliminate the need to further dispose a light absorptive material layer 22 on the surface of the second substrate 20 opposite to the first substrate 10.

The composition of the cholesteric liquid crystal layers, and the related measurement results of reflection and the curves of driving voltages for the Examples and the Comparative Examples are described in detail as below:

COMPARATIVE EXAMPLE 1

Figure 2:
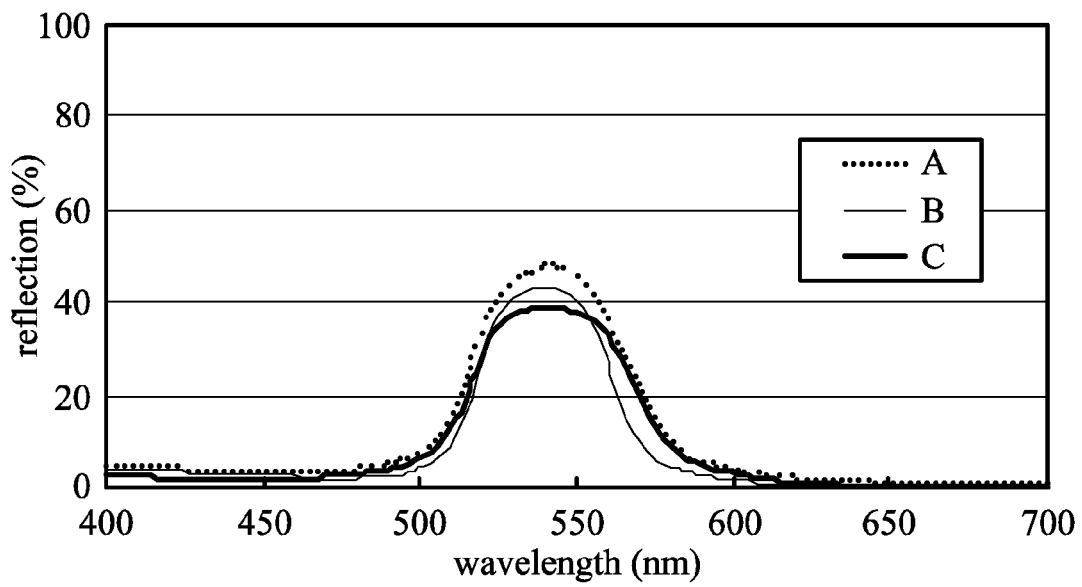
FIG. 2 shows curves of reflection versus wavelength of single-layered cholesteric liquid crystal layers according to Comparative Examples 1~3 of the invention.

Comparative Example 1 was a single layer of cholesteric liquid crystal layer, wherein a right-handed chiral dopant of (−)-YN-0885-133 (product of Merck Company) was added. The molecular structure of (−)-YN-0885-133 was shown as below:

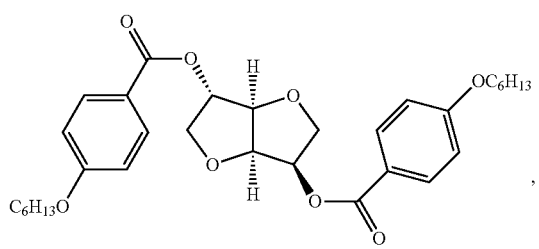

in which, the liquid crystal host was a nematic liquid crystal BL087 (product of Merck Company). The adding amount of the chiral dopant of (−)-YN-0885-133 was about 4.8 weight %. A curve of reflection versus wavelength of the single layered cholesteric liquid crystal layer of the Comparative Example 1 was measured by a JASCO V-550 UV/Visible spectrometer. In this measurement, the cholesteric liquid crystal layer was disposed between two glass plates. A single wavelength light source was used to irradiate the cholesteric liquid crystal layer for measuring the reflections at each wavelength. The result is shown as the curve A in FIG. 2, and the reflection thereof was 48%. In addition, a curve of reflection versus voltage of the single layered cholesteric liquid crystal layer of the Comparative Example 1 was measured by an Autronics DMS-803 apparatus. In this measurement, the cholesteric liquid crystal layer was injected into a liquid crystal cell. A full-wavelength band light source was used to irradiate the cholesteric liquid crystal layer. A voltage was applied to the cholesteric liquid crystal layer and then the voltage was turned off to measure the reflections of each applied voltage. The result is shown as the curve F in FIG. 4.

COMPARATIVE EXAMPLE 2

Comparative Example 2 was a single layer of cholesteric liquid crystal layer, wherein a left-handed chiral dopant of (+)-YN-0885-133 (product of Merck Company) was added. The molecular structure of (+)-YN-0885-133 was shown as below:

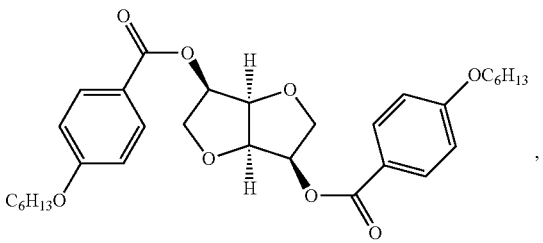

in which, the liquid crystal host was the same as the Comparative Example 1. The adding amount of the chiral dopant of (+)-YN-0885-133 was about 8 weight %. A curve of reflection versus wavelength of the single layered cholesteric liquid crystal layer of the Comparative Example 2 was measured by the JASCO V-550 UV/Visible spectrometer. The result is shown as the curve B of FIG. 2, and the reflection thereof was 43%. In addition, a curve of reflection versus voltage of the single layered cholesteric liquid crystal layer of the Comparative Example 2 was measured by the Autronics DMS-803 apparatus. The result is shown as the curve G of FIG. 4.

COMPARATIVE EXAMPLE 3

Comparative Example 3 was a single layer of cholesteric liquid crystal layer, wherein a left-handed chiral dopant of (+)-1011 (product of Merck Company) was added. The molecular structure of (+)-1011 was shown as below:

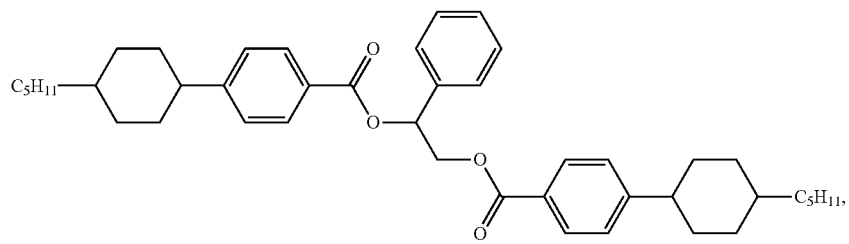

in which, the liquid crystal host was the same as the Comparative Example 1. The adding amount of the chiral dopant of (+)-1011 was about 6.9 weight %. A curve of reflection versus wavelength of the single layered cholesteric liquid crystal layer of the Comparative Example 3 was measured by the JASCO V-550 UV/Visible spectrometer. The result is shown as the curve C of FIG. 2, and the reflection thereof was 39%. In addition, a curve of reflection versus voltage of the single layered cholesteric liquid crystal layer of the Comparative Example 3 was measured by the Autronics DMS-803 apparatus. The result is shown as the curve H of FIG. 4.

EXAMPLE 1

Example 1 was a dual-layered left-handed and right-handed cholesteric liquid crystal layer stacked by a cholesteric liquid crystal layer formed by adding 4.8 weight % of a right-handed chiral dopant of (−)-YN-0885-133 and a cholesteric liquid crystal layer formed by adding 8 weight % of a left-handed chiral dopant of (+)-YN-0885-133, wherein the liquid crystal host was the same as the Comparative Example 1. A curve of reflection versus wavelength of the dual-layered left-handed and right-handed cholesteric liquid crystal layer of the Example 1 was measured by the JASCO V-550 UV/Visible spectrometer. The result is shown as the curve D of FIG. 3, and the reflection thereof was about 95%. In addition, a curve of reflection versus voltage of the dual-layered left-handed and right-handed cholesteric liquid crystal layer of the Example 1 was measured by the Autronics DMS-803 apparatus. The result is shown as the curve I of FIG. 5.

COMPARATIVE EXAMPLE 4

Comparative Example 4 was a dual-layered left-handed and right-handed cholesteric liquid crystal layer stacked by a cholesteric liquid crystal layer formed by adding 4.8 weight % of a right-handed chiral dopant of (−)-YN-0885-133 and a cholesteric liquid crystal layer formed by adding 6.9 weight % of a left-handed chiral dopant of (+)-1011, wherein the liquid crystal host was the same as the Comparative Example 1. A curve of reflection versus wavelength of the dual-layered left-handed and right-handed cholesteric liquid crystal layer of the Comparative Example 4 was measured by the JASCO V-550 UV/Visible spectrometer. The result is shown as the curve E of FIG. 3, and the reflection thereof was 73%. In addition, a curve of reflection versus voltage of the dual-layered left-handed and right-handed cholesteric liquid crystal layer of the Comparative Example 4 was measured by the Autronics DMS-803 apparatus. The result is shown as the curve J of FIG. 5

Figure 3:
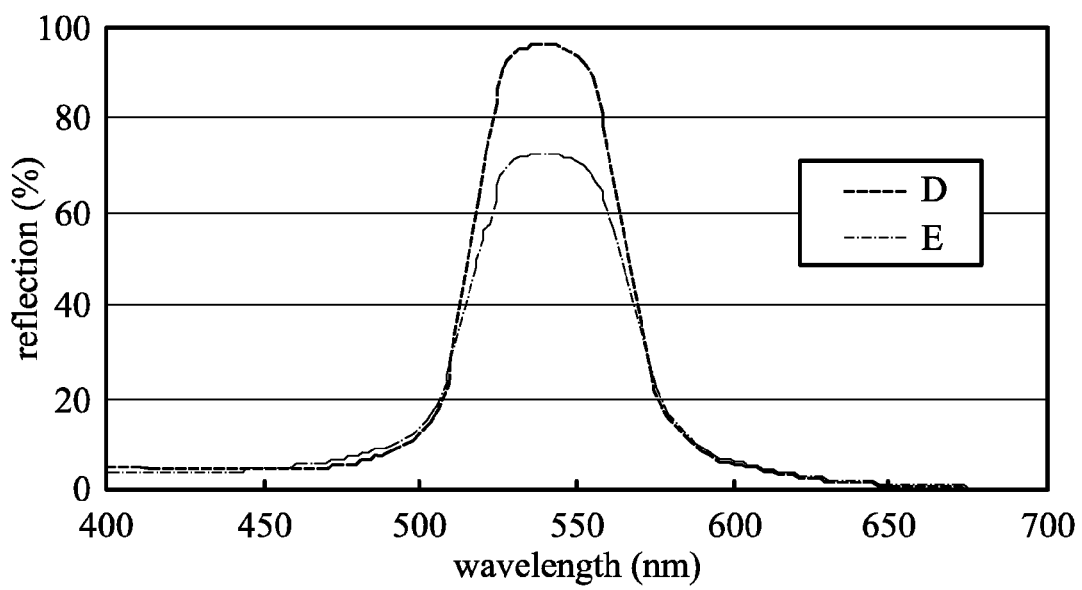
FIG. 3 shows curves of reflection versus wavelength of dual-layered left-handed and right-handed cholesteric liquid crystal layers according to Example 1 and Comparative Example 4 of the invention.

Comparing the curve D with the curve E of FIG. 3, it is shown that the reflection of the Example 1 of the invention was 95%, which was an increase of about 23% over the reflection of 73% of the Comparative Example 4. Thus, the dual-layered left-handed and right-handed cholesteric liquid crystal layer of the invention formed by utilizing the chiral dopants with the same chemical structure but different optical activities does significantly enhance the reflections of the liquid crystal displays. Meanwhile, when looking at the reflections of FIG. 2 and FIG. 3, it is shown that the difference in the reflection of FIG. 2 between the single layered cholesteric liquid crystal layers formed by adding the chiral dopant of (+)-YN-0885-133 and the chiral dopant of (+)-1011, respectively, is about 9%. However, the reflection of the Example 1 of the invention was enhanced by about 23% over the reflection of the Comparative Example 4. Thus, the invention utilizing the chiral dopants with the same chemical structure but different optical activities to form the dual-layered left-handed and right-handed cholesteric liquid crystal layer had an added effect on enhancing the reflections of the liquid crystal displays.

Figure 4:
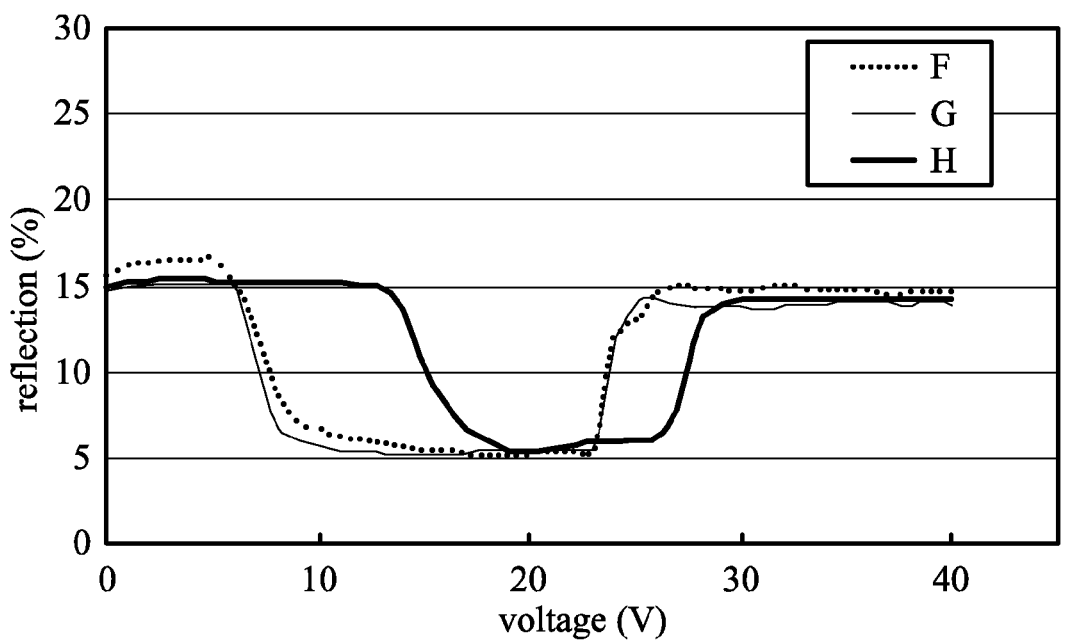
FIG. 4 shows curves of reflection versus voltage of single-layered cholesteric liquid crystal layers according to Comparative Examples 1~3 of the invention.
Figure 5:
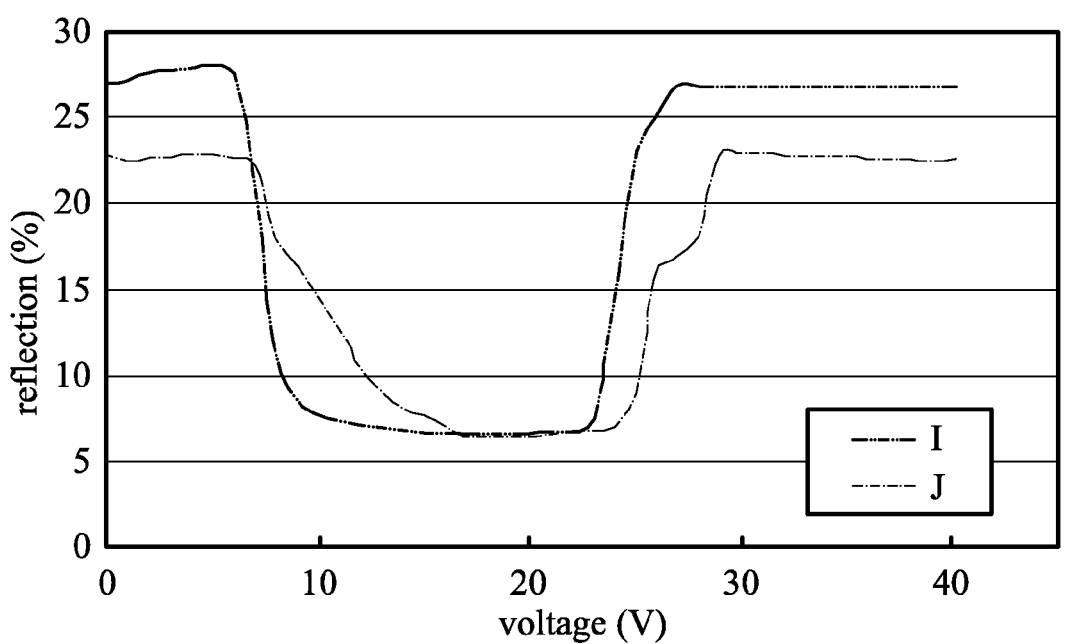
FIG. 5 shows curves of reflection versus voltage of dual-layered left-handed and right-handed cholesteric liquid crystal layers according to Example 1 and Comparative Example 4 of the invention.

In addition, from the curves of reflection versus voltage in FIG. 4 and FIG. 5, it is shown that the driving voltage curve I of the Example 1 of the invention was consistent with the driving voltage curves F and G of the Comparative Examples 1 and 2. Compared with the driving voltage curve of the Example 1 of the invention, the driving voltage curve of the Comparative Example 4 shifted toward higher voltages. Thus, the two layers of left-handed and right-handed cholesteric liquid crystal layers of the invention formed from utilizing the chiral dopants with the same chemical structure but different optical activities had consistent driving voltages and the driving voltages were also reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
    a first substrate;
    a second substrate disposed opposite to the first substrate;
    a light absorptive electrode layer disposed on the second substrate facing the first substrate;
    a first cholesteric liquid crystal layer disposed between the first substrate and the second substrate, wherein the first cholesteric liquid crystal layer comprises a first chiral dopant;
    a second cholesteric liquid crystal layer disposed between the first substrate and the second substrate, wherein the second cholesteric liquid crystal layer comprises a second chiral, dopant; and
    wherein the first chiral dopant and the second chiral dopant have different optical activities and
    wherein the first chiral dopant and the second chiral dopant have the same chemical structure.

2. The liquid crystal display as claimed in claim 1, wherein the first cholesteric liquid crystal layer and the second cholesteric liquid crystal layer are a left-handed cholesteric liquid crystal layer and a right-handed cholesteric liquid crystal layer, respectively.

3. The liquid crystal display as claimed in claim 1, wherein the chemical structure of the first chiral dopant and the second chiral dopant is represented by Formula (I):

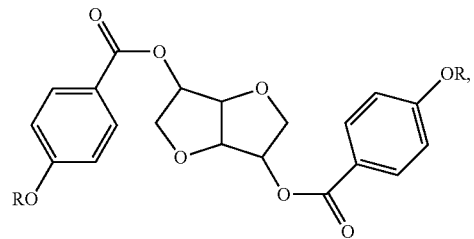

Formula (I)

wherein R is $C_{1-6}$ alkyl.

4. The liquid crystal display as claimed in claim 1, wherein the first chiral dopant is a right-handed chiral dopant having a molecular stereostructure represented by Formula (II):

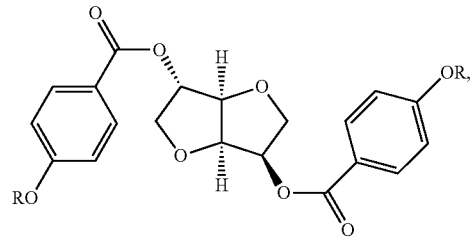

Formula (II)

wherein R is $C_{1-6}$ alkyl.

5. The liquid crystal display as claimed in claim 1, wherein the first chiral dopant is a left-handed chiral and dopant having a molecular stereostructure represented by Formula (III):

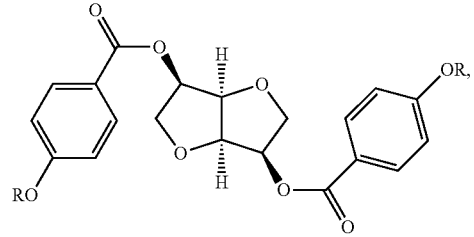

Formula (III)

wherein R is $C_{1-6}$ alkyl.

6. The liquid crystal display as claimed in claim 1, wherein the liquid crystal display is a reflective cholesteric liquid crystal display and light permeates through the reflective cholesteric liquid crystal display through the first substrate.

7. The liquid crystal display as claimed in claim 1, wherein the first substrate and the second substrate comprise a glass substrate or a plastic substrate.

8. The liquid crystal display as claimed in claim 1, wherein the first cholesteric liquid crystal layer and second cholesteric liquid crystal layer have identical driving voltages.

9. The liquid crystal display as claimed in claim 1, further comprising an isolation film disposed between the first cholesteric liquid crystal layer and second cholesteric liquid crystal layer.

10. A method for fabricating a liquid crystal display, comprising:
providing a first substrate;
providing a second substrate disposed opposite to the first substrate;
forming a light absorptive electrode layer on the second substrate facing the first substrate;
providing a liquid crystal host;
adding a pair of chiral, dopants having different optical activities into the liquid crystal host to form at least two kinds of cholesteric liquid crystal materials, wherein each chiral dopant of the pair of the chiral dopants has the same chemical structure; and
disposing the at least two kinds of cholesteric liquid crystal materials between the first substrate and the second substrate to form at least two layers of cholesteric liquid crystal layers.

11. The method as claimed in claim 10, wherein the cholesteric liquid crystal layers comprise a left-handed cholesteric liquid crystal layer and a right-handed cholesteric liquid crystal layer.

12. The method as claimed in claim 10, wherein the chemical structure of the pair of chiral dopants is represented by Formula (I):

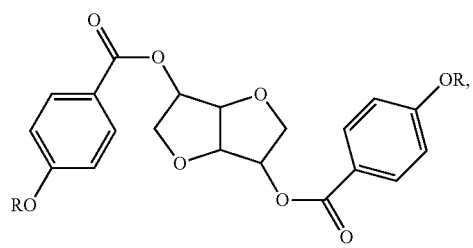

Formula (I)

wherein R is $C_{1-6}$ alkyl.

13. The method as claimed in claim 10, wherein one chiral dopant from the pair of chiral dopants is a right-handed chiral dopant having a molecular stereostructure represented by Formula (II):

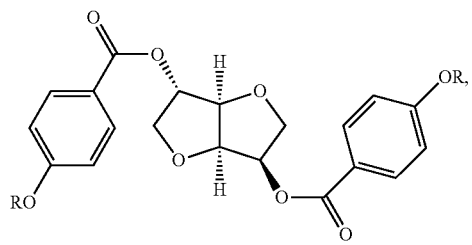

Formula (II)

wherein R is $C_{1-6}$ alkyl.

14. The method as claimed in claim 10, wherein one chiral dopant from the pair of chiral dopants is a left-handed chiral dopant having a molecular stereostructure represented by Formula (III):

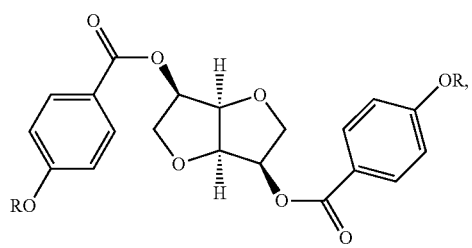

Formula (III)

wherein R is $C_{1-6}$ alkyl.

15. The method as claimed in claim 10, wherein the liquid crystal display is a reflective cholesteric liquid crystal display, and light permeates through the reflective cholesteric liquid crystal display through the first substrate.

16. The method as claimed in claim 10, wherein the first substrate and the second substrate comprise a glass substrate or a plastic substrate.

17. The method as claimed in claim 10, wherein the cholesteric liquid crystal layers have identical driving voltages.

18. The method as claimed in claim 10, further comprising forming an isolation film between the cholesteric liquid crystal layers.

19. A liquid crystal display, comprising:
a first substrate;
a second substrate disposed opposite to the first substrate;
a light absorptive electrode layer disposed on the second substrate facing the first substrate;
a first cholesteric liquid crystal layer disposed between the first substrate and the second substrate, wherein the first cholesteric liquid crystal layer comprises a first chiral dopant;
a second cholesteric liquid crystal layer disposed between the first substrate and the second substrate, wherein the second cholesteric liquid crystal layer comprises a second chiral dopant; and
wherein the first chiral dopant and the second chiral dopant have different optical activities, wherein the first chiral dopant and the second chiral dopant have the same chemical structure, wherein the first cholesteric liquid crystal layer and the second cholesteric liquid crystal layer are a left-handed cholesteric liquid crystal layer and a right-handed cholesteric liquid crystal layer, respectively, wherein the first chiral dopant is a left-handed chiral dopant having a molecular stereostructure represented by Formula (III):

Formula (III)

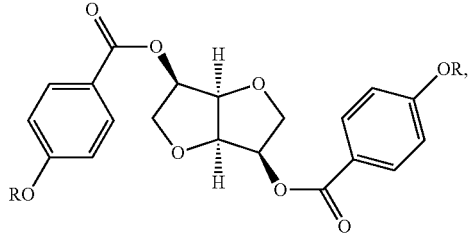

wherein R is $C_{1-6}$ alkyl, and
wherein the second chiral dopant is a right-handed chiral dopant having a molecular stereostructure represented by Formula (II):

Formula (II)

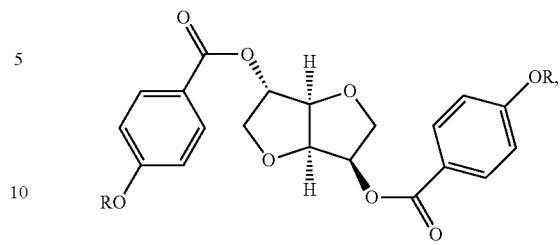

wherein R is $C_{1-6}$ alkyl.

20. The liquid crystal display as claimed in claim 19, further comprising an isolation film disposed between the first cholesteric liquid crystal layer and second cholesteric liquid crystal layer.

* * * * *